United States Patent
Wang et al.

(10) Patent No.: US 7,990,997 B2
(45) Date of Patent: Aug. 2, 2011

(54) CONTENTION BASED MEDIA ACCESS MECHANISM

(75) Inventors: Zhaocheng Wang, Stuttgart (DE); Qi Wang, Esslingen (DE)

(73) Assignee: Sony Corporation, Tokyo (JP)

( * ) Notice: Subject to any disclaimer, the term of this patent is extended or adjusted under 35 U.S.C. 154(b) by 357 days.

(21) Appl. No.: 12/145,043

(22) Filed: Jun. 24, 2008

(65) Prior Publication Data

US 2009/0022174 A1    Jan. 22, 2009

(30) Foreign Application Priority Data

Jul. 18, 2007  (EP) .................................... 07112683

(51) Int. Cl.
*H04L 12/413* (2006.01)

(52) U.S. Cl. ........ 370/447; 370/338; 370/445; 370/461; 370/462; 340/10.1; 340/10.2; 340/572.1

(58) Field of Classification Search .................. 370/338, 370/445–447, 458, 461–462; 340/10.1, 10.2, 340/572.1

See application file for complete search history.

(56) References Cited

U.S. PATENT DOCUMENTS

| | | | |
|---|---|---|---|
| 6,674,765 B1 * | 1/2004 | Chuah et al. | 370/458 |
| 7,176,797 B2 * | 2/2007 | Zai et al. | 340/572.1 |
| 7,511,604 B2 * | 3/2009 | Raphaeli et al. | 340/10.2 |
| 2006/0116092 A1 | 6/2006 | Uno et al. | |
| 2006/0221920 A1 * | 10/2006 | Gopalakrishnan et al. | 370/338 |
| 2007/0037528 A1 | 2/2007 | Doan et al. | |
| 2008/0002734 A1 * | 1/2008 | Zheng et al. | 370/445 |
| 2008/0297312 A1 * | 12/2008 | Moshfeghi | 340/10.1 |

FOREIGN PATENT DOCUMENTS

| | | |
|---|---|---|
| WO | WO 01/73970 A2 | 10/2001 |
| WO | WO 02/39622 A1 | 5/2002 |
| WO | WO 03/069937 A1 | 8/2003 |
| WO | WO 03/098528 A2 | 11/2003 |
| WO | 2 003 799 A1 | 12/2008 |

OTHER PUBLICATIONS

U.S. Appl. No. 12/323,646, filed Nov. 26, 2008, Wang, et al.
Sung-Min Oh, et al., "The Analysis of the Optimal Contention Period for Broadband Wireless Access Network", Proceedings of the 3rd Int'l Conf. on Pervasive Computing and Communications Workshops, 5 Pages, May 2005.
Young-Bae Ko, et al., "Medium Access Control Protocols Using Directional Antennas in Ad Hoc Networks", Department of Computer Science, Texas A &M University, 9 Pages, Mar. 2000.

(Continued)

*Primary Examiner* — Hassan Kizou
*Assistant Examiner* — Toan D Nguyen
(74) *Attorney, Agent, or Firm* — Oblon, Spivak, McClelland, Maier & Neustadt, L.L.P.

(57) ABSTRACT

The present invention relates to the field of contention in a network of communicating nodes. The present invention especially relates to a master node for a communication network, to a slave node device for a communication network, to a network comprising the master node device and at least one slave node device and to a method of contention in a network of nodes. The method of contention according to the present invention is method in a network comprising slave nodes, said slave nodes comprising a group of first slave nodes, the method comprising the step of sending, by every first slave node participating in a contention, a number of two or more contention participation messages during a contention window associated with the first slave node.

21 Claims, 6 Drawing Sheets

OTHER PUBLICATIONS

Mineo Takai, et al., "Directional Virtual Carrier Sensing for Directional Antennas in Moblie Ad Hoc Networks", MOB1HOC '02, UCLA Computer Science Department, Jun. 9-11, 2002, 11 Pages.

Harkirat Singh, et al., "Smart-802.11b MAC protocol for use with Smart Antennas", Department of Computer Science, Portland State University, Jun. 2004.

* cited by examiner

CONTENTION BASED MEDIA ACCESS MECHANISM

FIELD OF THE INVENTION

The present invention relates to the field of contention in a network of communicating nodes. The present invention especially relates to a master node device for a communication network, to a slave node device for a communication network, to a network comprising the master node device and at least one slave node device and to a method of contention in a network of nodes.

DESCRIPTION OF THE RELATED PRIOR ART

Figure 1:
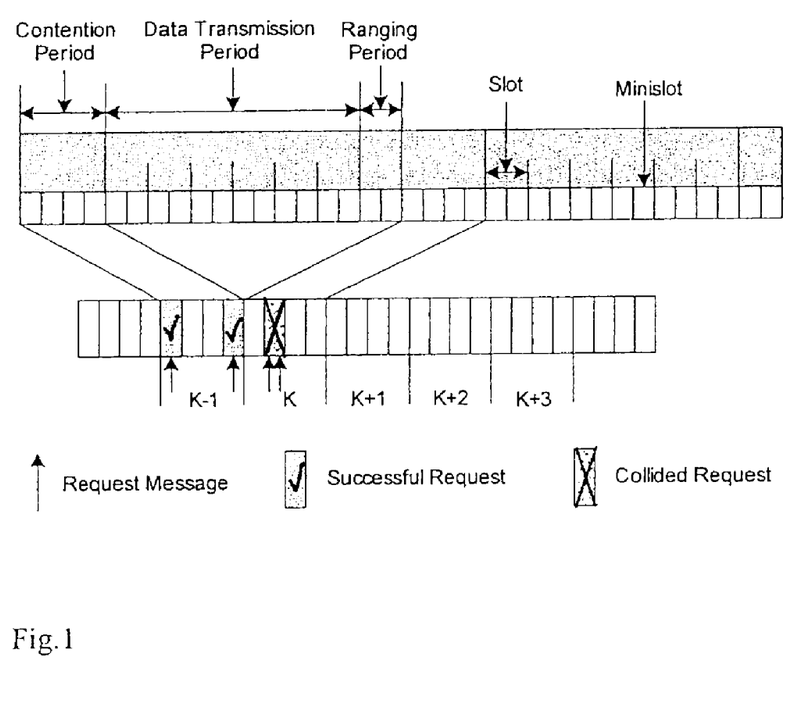
FIG. 1 shows the upstream frame structure of the IEEE 802.16 MAC protocol.

Contention based media access mechanisms of various kinds are employed in a plurality of different communication network protocols. For instance, in the IEEE 802.16 standard, the access mode for the upstream channel is based on TDMA and each upstream frame, composed of fixed size time minislots, is divided into a ranging period, a contention period and a data transmission period. FIG. 1 shows two successive upstream frames according to the IEEE 802.16 standard, as well as a plurality of successive contention periods (i.e. contention periods of successive frames). Each minislot of a contention period corresponds to a chance for sending a bandwidth request message from a subscriber station (SS) to a master station (MS). Hereby, each SS must not send more than one bandwidth request message during a contention period and the minislot a SS uses to send the messages is determined (pseudo) randomly. When two or more bandwidth request messages are concurrently transmitted in a minislot of a contention period, a collision is said to generated in the minislot and the MS can not successively receive the collided messages. This is detected—directly or indirectly— by the sending SSs and the collided bandwidth request messages are retransmitted during random minislots in the next frame. FIG. 1 shows two successfully transmitted requests in a frame K−1 and two collided requests in a frame K. Obviously, when requests collide, the media access delay increases.

The increase of access delay due to colliding requests is especially unfavorable in the case of beam steerable antenna or multi antenna (directional antennas arranged to provide different beam directions) communication network nodes, which are known from the patent applications US20060116092 and EP07110084, because a path scanning activity, which the nodes are required to perform, increases the time span between successive communication possibilities between the nodes. In such a system each combination of beam directions of two nodes corresponds to a potential communication path between the nodes. When the path scanning is performed, the communication paths are successively switched through (e.g. one path per frame) and communication between the nodes is possible only when the currently selected communication path is actually reliable to transmit information. Because, typically only few of the possible communication paths are actually reliable to transmit information, this increases the time span (e.g. a plurality of frames) between successive communication possibilities between the nodes. Thus, an application of a state of the art contention based media access mechanism to such system may lead to very large access delays.

The ranging period of the IEEE 802.16 upstream frame too serves a contention purpose just as the contention period. The ranging period is used for the initial ranging where a node previously not connected to the network may indicate its presence and identify itself to the network by sending a corresponding message to the MS. Obviously, the same problems arise in relation to the ranging period as do arise for the contention period.

However, the present invention is profitably employed also to contention systems of a wider conception, which will be described in the following.

In a contention, contestant nodes compete for a right or status in a communication network (e.g. the exclusive transmission right for a communication channel of a transmission medium of the communication network). Not all of the nodes of the network may be allowed to participate in a contention and not all of the nodes which are allowed to participate in a contention may actually participate in the contention and become contestant nodes by sending a contention participation message. By using methods of multiple access (e.g. Frequency Division Multiple Access, Time Division Multiple Access, Code Division Multiple Access and combinations thereof), a physical transmission medium can provide a plurality of communication channels. Associated with a contention is a plurality of communication channels. Each one of the communication channels is operable to transmit one contention participation message to the contention master node. To be precise, each communication channel is a single-access communication channel, meaning that only one but not two or more contestant nodes can use the communication channel in order to transmit a contention participation message to the master node. For every contestant node a contention window which is a set of communication channels taken from among the plurality of communication channels is defined. In a contention, each contestant node (pseudo-) randomly chooses a communication channel, from among the node's contention window and sends a contention participation message using the selected communication channel. Hereby, collisions of the contention participation messages occur when at least two contestant nodes do employ the same communication channel which means that the contention master can not successfully receive the collided contention participation messages. Collision may occur (occurs with some probability greater than zero) when at least one set of the sets of communication channels is mutually overlapping with at least one other set of the sets of communication channels. Contention schemes exist, where all sets are overlapping or even are identical. However, generally, the sets of communication channels are determined based on a (pseudo-)stochastic process so that it can not be said a priori which sets are overlapping. Thus, it can be said that that each contention participation message is sent using a single-access communication channel which is adapted to transmit exactly one contention participation message and which is adapted to transmit said exactly one contention participation messages only when accessed by exactly one node of the contestant nodes and that there is a probability greater than zero that two or more contestant nodes are using (i.e. are accessing) the same communication channel for sending a contention participation message. This may be formulated in still another way. As each communication channel can be seen as a reception channel of the contention master node, it can be said that there is a probability greater than zero that contention participation messages sent by different contestant nodes collide in a reception channel of the contention master node and, thus, can not be received by the contention master.

A contention participation message allows to identify the sending node (e.g. by comprising an identifier of the sending node or by comprising an identifier of an entity uniquely identifying the sending node). The right or status may be precisely defined beforehand. On the other hand, a contention participation message may comprise information describing (more precisely) the right or status which the contestant node wishes to achieve by participating in the contention. When the contention master successfully receives a contention participation message it will decide if, and to which extent, it grants the right or status. The status may comprise the right to (exclusively) use a resource of the communication network.

Eventually, when the status is not granted, the contestant node may retry to send the contention participation message based on a further contention window, that is, based on a further set communication channels taken from among the plurality of communication channels. This further set may comprise a different number of communication channels than the initial or previous set of communication channels (in a truncated binary exponential backoff type of contention resolution for example, this further set will comprise more communication channels than the initial or previous set communication channels). Thus, the number of communication channels per set may depend on the number of previous attempts of a contestant node to send the contention participation message.

The problem to be solved by the present invention is to provide for an improved method of contention for a right or status in a communication network and to provide for communication devices and a network operating the improved method.

BRIEF DESCRIPTION OF THE INVENTION

This problem is solved by a method of contention in a network comprising slave nodes, said slave nodes comprising a group of first slave nodes, the method comprising the step of sending, by every first slave node participating in a contention, a number of two or more contention participation messages during a contention window associated with the first slave node.

Sending at least two contention participation messages has the advantage that the possibility of successively transmitting at least one contention participation messages may be increased. The group of first slave nodes may comprise all slave nodes.

Advantageously, the method comprises the step of automatically determining a number of contention participation messages which are to be sent by each first slave node, whereby, in case the determined number is equal or more than two, the step of sending, by every first slave node participating in the contention, a number of two or more contention participation messages is executed and the number of two or more contention participation messages is given by the determined number and, in case that the determined number of contention participation messages is one, instead of executing the step of sending, by every first slave node participating in the contention, a number of two or more contention participation messages, a step of sending, by every first slave node participating in the contention, one contention participation message during the contention window associated with the first slave node is executed.

Advantageously, the network comprises a master node, said master node comprising a radiation or wave emitter and receiver, whereby said first group of first slave nodes comprises only slave nodes with which the master node is able to communicate based on a common direction of emission and reception of the radiation or wave emitter and receiver.

Advantageously, the step of automatically determining a number of contention participation messages is based on the number of first slave nodes which are allowed to participate in the contention.

Advantageously, the step of automatically determining a number of contention participation messages is based on the number of first slave nodes which are expected to participate in the contention.

Advantageously, the step of automatically determining a number of contention participation messages is executed repeatedly.

Advantageously, the method comprises the step of repeatedly sending a beacon signal from a master node to the slave nodes and contention participation messages from the slave nodes to the master node during a beacon period and a following contention period, respectively.

Advantageously, said beacon period and said following contention period together form a path scanning period, whereby contention participation messages of a given path scanning period and sent by a given slave node and the beacon signal of said given path scanning period are transmitted using a same communication path and contention participation messages of at least two different path scanning periods and sent by a given slave node and the beacon signals of said at least two different path scanning periods are transmitted using different communication paths.

Advantageously, the method comprises the steps of determining, for every first slave node, if the first slave node has successively received a beacon signal in a given beacon period and determining, for every first slave node, a set communication channels, each communication channel adapted to transmit exactly one contention participation message, said set of communication channels corresponding to said contention window associated with the first slave node, whereby, in case that a beacon signal is determined to be successively received in a given beacon period by one of the first slave nodes, the set of communication channels is determined to comprise communication channels from among communication channels provided by the contention period following the given beacon period and, in case that a beacon signal is not determined to be successively received in a given beacon period, said set of communication channels is determined not to comprise communication channels from among communication channels provided by the contention period following a given beacon period.

The problem is further solved by a master node device for a communication network comprising slave nodes, said slave nodes comprising a group of first slave nodes, said master node device comprising a communication unit operable to receive two or more contention participation messages sent from one first slave node during a contention window associated with that first slave node, select one of the received two or more contention participation messages for further processing and neglect the others.

Advantageously, the communication unit is adapted to determine a number of contention participation messages which are to be sent by each first slave node and send the determined number of contention participation messages.

Advantageously, the communication unit comprises a radiation or wave emitter and receiver, whereby said group of first slave nodes comprises only slave nodes with which the master node device is able to communicate based on a common direction of emission and reception of the radiation or wave emitter and receiver.

Advantageously, the determined number of contention participation messages is dependent on the number of first slave nodes which are allowed to send a contention participation message.

Advantageously, the determined number of contention participation messages is dependent on the number of first slave nodes which are expected to send a contention participation message.

Advantageously, the communication unit is adapted to repeatedly determine the number of contention participation messages and set it to the first slave nodes.

Advantageously, the communication unit is adapted to repeatedly send a beacon signal and receive contention participation messages during a beacon period and a following contention period, respectively.

Advantageously, said beacon period and said following contention period together form a path scanning period, whereby the beacon signal and the contention participation messages of a given path scanning period are sent and received using a same direction of emission and reception and the beacon signals and contention participation messages of at least two different path scanning periods are sent and received using different directions of emission and reception.

The problem is further solved by a slave node device for a communication network comprising slave nodes, said slave nodes comprising a group of first slave nodes, said slave node device being a member of said group of first slave nodes, said slave node device comprising a communication unit adapted to send two or more contention participation messages during a contention window associated with the slave node device.

Advantageously, the slave node device comprises a control unit adapted to determine a number of contention participation messages which are to be sent during the contention window.

Advantageously, the number of contention participation messages is indicated in a signal received by the slave node device and the control unit is adapted to determine the number of contention participation messages based on the received signal.

Advantageously, the control unit is adapted to repeatedly determine the number of contention participation messages.

Advantageously, the communication unit is adapted to repeatedly receive a beacon signal and send contention participation messages during a beacon period and a following contention period, respectively.

Advantageously, said beacon period and said following contention period together form a path scanning period, whereby the beacon signal and the contention participation messages of a given path scanning period are received and sent using a same direction of emission and reception and the beacons and contention participation messages of at least two different path scanning periods are received and sent using different directions of emission and reception.

Advantageously, the control unit is adapted to determine if the communication unit has successively received a beacon signal in a given beacon period and determine a set of communication channels, each communication channel adopted to transmit exactly one contention participation message, said set of communication channels corresponding to said contention window, whereby said set of communication channels is determined to comprise communication channels from among communication channels provided by the contention period following a given beacon period in case that a beacon signal is determined to be successively received in the given beacon period and said set of communication channels is determined not to comprise communication channels from among communication channels provided by the contention period following a given beacon period in case that a beacon signal is not determined to be successively received in the given beacon period.

It is possible that a device may be both a master node device and a slave node device and changes between the roles dynamically.

The problem is further solved by a communication network comprising a master node device according to the present invention and at least one slave node device according to the present invention.

DESCRIPTION OF THE PREFERRED EMBODIMENTS

The communication network of the present invention may be based on any transmission medium including, as examples, RF, optical, IR, and ultrasonic transmission media. The communication network may be wired or wireless. The communication network may be any network of communicating nodes, it may, for example, be a telecommunication network, a computer network comprising or may be part of a single device (e.g. a data bus together with connected devices in a computer or a multi-core processor). Communication in the network may, for example, be based on omnidirectional (wide beam) antennas or directional (narrow beam) antennas and combinations thereof. The communication network may, for example, be a single-carrier system or a multi carrier system.

Figure 2:
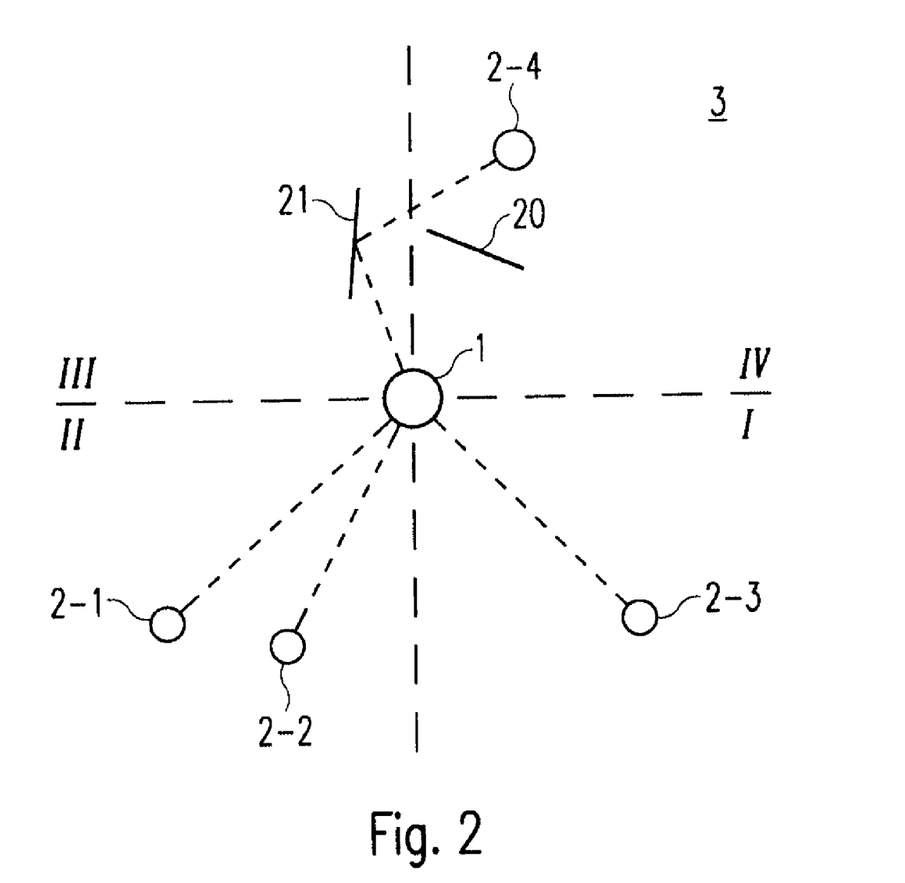
FIG. 2 shows a network according to the embodiment of the present invention.

In the following, an embodiment of the communication network 3 according to present invention will be described. As is shown in FIG. 2, the network 3 comprises a master station (MS) node 1 and a plurality of subscriber stations (SS) nodes 2-1, 2-2, 2-3, 2-4. When no special SS node or when the plurality of SS nodes is addressed, the reference numeral 2 will be utilized. The MS 1 has a beam steering antenna with four directions of emission and reception yielding four corridors of emission and reception which are labeled I to IV, the number of four being only an example. Besides depicted as being non-overlapping in FIG. 2, the corridors may be overlapping. The SS 2-3 is in the first corridor I and is communicating with the MS 1 using the corresponding first direction of emission and reception. The SSs 2-1 and 2-2 are in the second corridor II and are communicating with the MS 1 based on the corresponding second direction of emission and direction. The SS 2-4 is in the fourth corridor IV, but due to a blocking object 20 which is blocking the line of sight communication path and a reflecting object 21 which is reflecting the transmission signal so that a bended communication path is obtained, the SS 2-4 communicates with the MS 1 based one the third direction of emission and reception corresponding to the third corridor III. Asides from not being shown in FIG. 2, a SS 2 may communicate with the MS 1 based on more than one direction of emission and reception of the MS 1.

Figure 3:
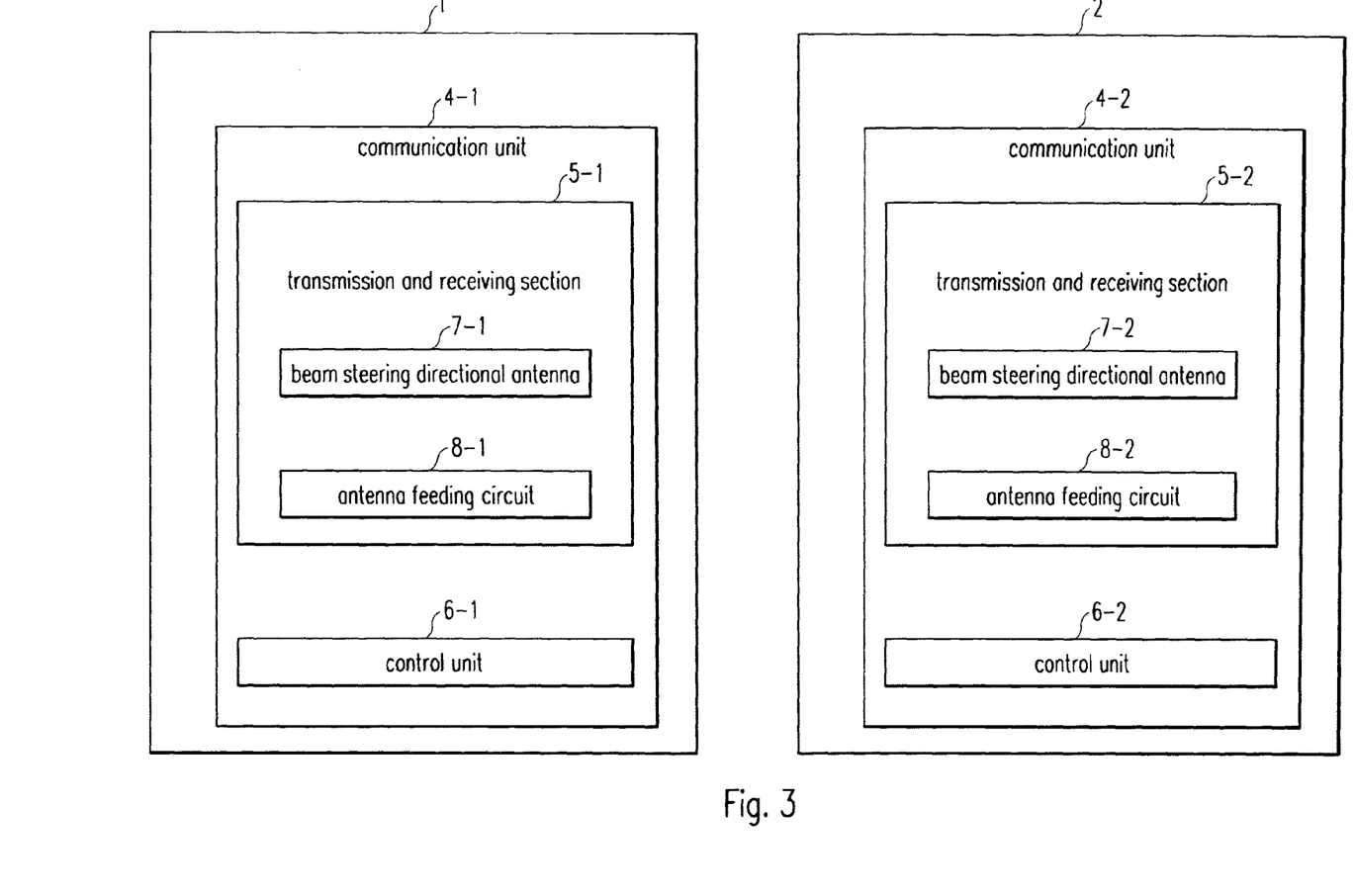
FIG. 3 shows a schematic view of master station node and a subscriber station node of the embodiment of the present invention.
Figure 5:
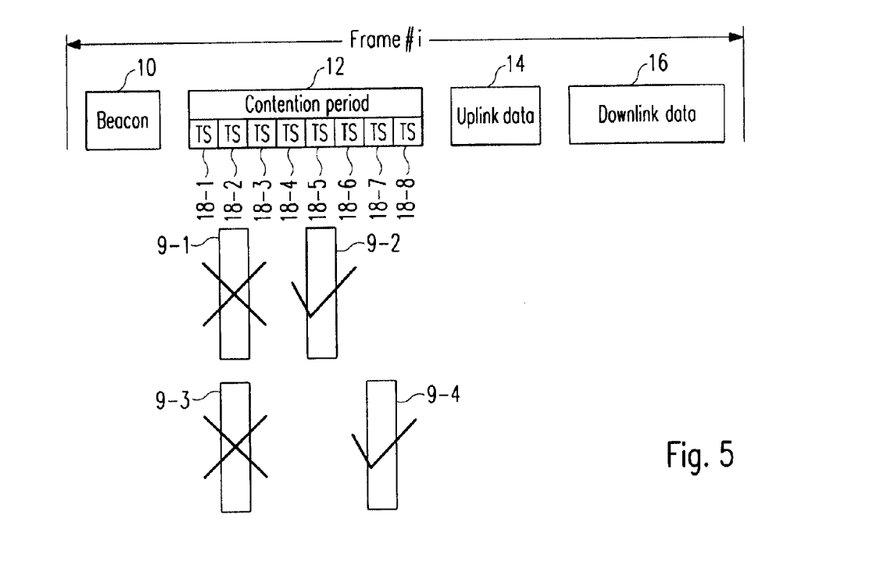
FIG. 5 shows an example of bandwidth request messages sent in accordance with the embodiment of the present invention.

FIG. 3 shows a MS node 1 and a SS node 2. The MS 1 comprises a communication unit 4-1. The communication unit 4-1 comprises a transmission and receiving section 5-1 and a control unit 6-1. The transmission and receiving section 5-1 comprises a conventional beam steering directional antenna 7-1 and a conventional antenna feeding circuitry 8-1. The SS 2 comprises a communication unit 4-2. The communication unit 4-2 comprises a transmission and receiving section 5-2 and a control unit 6-2. The transmission and receiving section 5-2 comprises a conventional beam steering directional antenna 7-2 and a conventional antenna feeding circuitry 8-2. The control units 6-1, 6-2 may be implemented using any information processing technology, for example, hard-wired logic, programmable microprocessors and volatile and non-volatile memory. The MS 1 and the SS 2 may comprise other units and subunits, for example, a power supply, but such are known to the skilled person and, for the sake of clarity, not shown in FIG. 3. The nodes 1, 2 are provided with beam steering directional antennas 7 (i.e. antennas having a plurality of selectable antenna directions). Directional antennas 7 offer many benefits compared to classical omnidirectional antennas. The most important include significant increase of spatial reuse, coverage range and low interferences. Each combination of an MS antenna direction and an SS antenna direction corresponds to a spatially different communication path. Thus, path diversity is provided between the nodes 1, 2. A usage scenario for such a system utilizing beam steering directional antennas is provided in the patent applications US20060116092 and US20070037528. In the embodiment, each SS node 2 chooses from among eight communication channels for sending bandwidth request messages 9 (messages 9 are shown in FIG. 5), whereby the number of eight is only an example.

Figure 4:
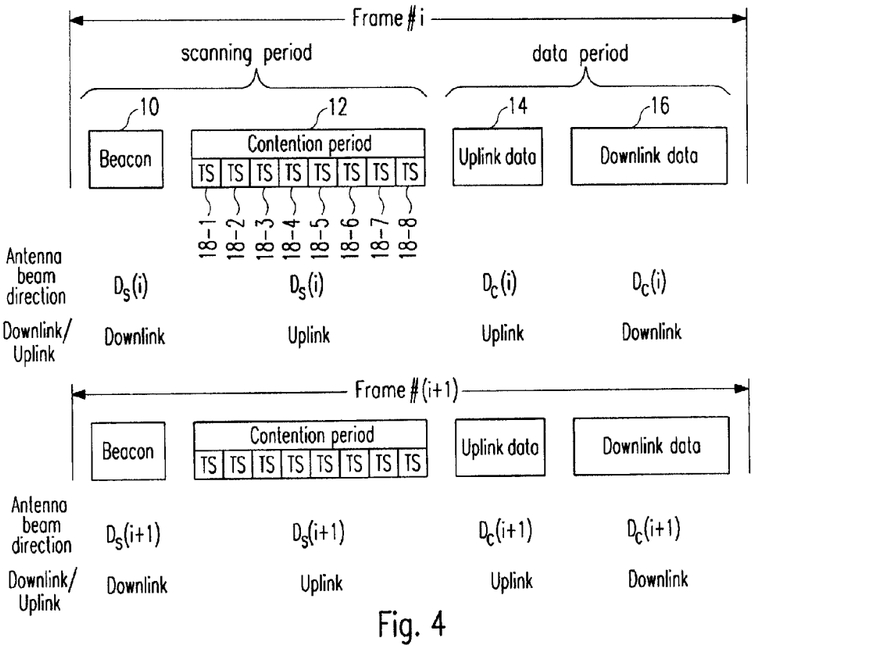
FIG. 4 shows the frame structure according to the embodiment of the present invention.

FIG. 4 shows the frame structure according to the embodiment of the present invention. Shown are two successive frames i and i+1, whereby the index i counts the frames. Each frame comprises a beacon period 10, a contention period 12, an uplink data period 14 and a downlink data period 16, during which a beacon 10, bandwidth request messages 9, uplink data 14 and downlink data 16 are respectively transmitted and received (no separate reference numerals will be used for the period and the respective data in case of periods 10, 14 and 16). The beacon period 10 and the downlink data period 14 correspond to a downlink (data is transmitted from MS 1 to SS 2). The contention period 12 and the uplink data period 16 correspond to an uplink (data is transmitted from SS 2 to MS 1). The beacon period 10 and the contention period 12 are comprised in a scanning period and the uplink 14 and downlink 16 data periods are comprised in a data period following the contention period 12. There may be a plurality of uplink 14 and downlink 16 data periods in the data period as is described below. The contention period 12 comprises eight time slots (TS) 18-1 to 18-8, which correspond to the eight communication channels. The MS 1 is the contention master node and the SSs 2 are contestant nodes. Synchronization between the MS 1 and the SSs 2 is provided based on the beacon 10. Also, a channel quality is determined based on the beacon 10.

At first the situation is described when the MS 1 communicates with one SS 2 only. The same communication path $P_s$ is used during the beacon period 10 and the contention period 12 of a given frame. More formally, the path $P_s(i)$ is used during the scanning period of the frame i. The path $P_s$ changes every frame (both the antenna direction of the MS 1 and the SS 2 are switched through periodically (e.g. cyclically), whereby either the antenna direction of the MS 1 or the antenna direction of the SS 2 or both antenna directions change). Thus, $P_s(i+1)$ is not equal to $P_s(i)$. During the time when the path $P_s$ is active, the channel quality of the path $P_s$ is measured and corresponding channel quality information is obtained. The path $P_s$ is also used to exchange control information (e.g. antenna control information). Channel quality measurement and control information exchange are based on the beacon period 10 and the contention period 12 and/or the data transmitted during these periods (i.e. the beacon 10 and bandwidth request message 9), but may also involve other periods and data/signals transmitted between the MS 1 and the SS 2 in the scanning period using the path $P_s$. The periodic (e.g. cyclic) switching of the path $P_s$ corresponds to the path scanning mentioned above. The path $P_s$ corresponds to a direction of emission and reception of the MS 1 and a direction of emission and reception of the SS2.

Given a plurality of SSs 2, the operation of the MS 1 is unchanged and each SS 2 operates like the exemplary SS 2 just described. In this case, there are a plurality of paths PS, whereby the direction of emission and reception of the MS 1 is the same for all paths and the directions of emission and reception of the various SS 2 may be different (Anyway, the direction of emission and reception of a SS 2 is relative to the orientation of the SS 2). To describe this situation a new entity $D_s$ is introduced. $D_s(i)$ stands for the group of antenna directions during the path scanning period of the frame i and comprises the direction of emission and reception of the MS 1 and the directions of emission and reception of the SSs 2 (one for each SS 2) during that path scanning period.

Now, explanation in relation to the data period comprising the uplink 14 and downlink 16 data periods are given. Again, at first, the situation is described when the MS 1 communicates with one SS 1 only. The same communication path $P_c$ is used during the uplink data period 14 and the downlink data period 16 of a given frame. More formally, the path $P_c(i)$ is used during the uplink data period 14 and the downlink data period 16 of the frame i. Most of the time, the path $P_c(i+1)$ is equal to the path $P_c(i)$. The path $P_c$ is used for (main or high bandwidth) data exchange between the MS 1 and the SS 2 which are connected by the path $P_c$ and is called the current path.

The channel quality information is used to build up and update a communication path candidate table. In case the current communication path $P_c$ gets degraded or blocked (e.g. due to an object which moving into the path), the MS 1 and SS 2, by steering their antennas to other directions, will set another path as the current communication path $P_c$ in the next frame based on the communication path candidate table as is described in the patent applications US20060116092 and EP07110084.

The entity $D_c$ is introduced to describe the case that a plurality of SSs 2 are communicating with the MS 1 based on a common direction of emission and reception of the MS 1. In this case, the operation of the MS 1 is unchanged and each SS 2 operates like the exemplary SS 2 just described. $D_c(i)$ stands for the group of antenna directions during the uplink 14 data period and the downlink 16 data period and comprises the (common) direction of emission and reception of the MS 1 and the directions of emission and reception of the SSs 2 (one for each SS 2) during that period.

Now the case is treated that a plurality of SSs 2 are communicating with the MS 1 based on a plurality of directions of emission and reception of the MS 1. In this case, direction of emission and reception of the MS 1 may still be hold constant during the data period of a given frame and may vary only for data periods of different frames. This, however, corresponds to the situation already described above. On the other hand, the direction of emission and reception of the MS 1 may vary within the data period of a given frame. In this case, the data period of a given frame will comprise a plurality of pairs of an uplink data period 14 and an downlink data period 16. For each pair, the MS 1 and the corresponding SSs 2 operate as described above. For each pair, the direction of emission and reception of the MS 1 is constant and with each pair is associated a variable $D_c$ describing the directions of emission and reception used by the MS 1 and the SSs 2 as described above. For different pairs, the direction of emission and reception of the MS 1 differs.

In the embodiment, the contention window, which provides set of communication channels 18 from which a SS 2 selects a number of communication channels 18 for sending a corresponding number of contention participation messages 9 (bandwidth request messages 9), is provided within a single contention period 12. Moreover, the contention window, which provides the set of communication channels 18 from which a SS 2 selects a number of communication channels 18 for sending a corresponding number of contention participation messages 9 (bandwidth request messages 9), is given by the communication channels 18 (time slots 18) provided within a contention period 12. In other words, the contention window is given by the contention period 12.

Before describing the embodiment in further detail, an example of a contention based media access according to the prior art and the benefit of sending more than one contention participation messages will be explained.

Given the case that two SSs 2 participate in a contention, then, according to the prior art, each one of the two SSs 2 will randomly select one of the eight time slots 18 of the contention period 12 and will send one bandwidth request message 9 using the selected time slot 18. When both SSs 2 are using the same time slot 18 there is a collision and the MS can not receive the bandwidth request messages 9. The probability of collision in this case is 1/8. This probability corresponds to the probability of failure of sending a bandwidth request during the contention period 12.

However, given the inventive case that each one of the two SSs 2 randomly selects two time slots 18 from among the eight time slots 18 of the contention period 12 and sends two bandwidth request messages 9 using the randomly selected two time slots 18, the probability that both messages 9 will collide is 1/28. This probability corresponds to the probability of failure of sending a bandwidth request during a contention period 12.

Thus, the probability of failure of sending a bandwidth request and therefore the access delay can be significantly reduced by sending more than one bandwidth request message 9 during the contention period 12. In this case of a plurality of bandwidth request messages 9, it is appropriate to differentiate between bandwidth request which corresponds to the information that shall be transmitted and the bandwidth request messages 9 of which each one holds this information. It must be noted however, that the probability of failure is reduced only when the number of SSs 2 participating in a contention is relatively small. When the number becomes large, the effect of sending more than one message 9 will reverse and the probability of failure will increase.

An example of, two SSs 2-1, 2-2 sending two bandwidth request messages is shown in FIG. 5. The first SS 2-1 has selected the time slots 18-2 and 18-5 and transmits two bandwidth request messages 9-1 and 9-2 using the selected slots. The second SS 2-2 has selected the time slots 18-2 and 18-7 and transmits two bandwidth request messages 9-3 and 9-4 using the selected slots. Despite the fact that the messages 9-1 and 9-3 collide, the transmission of a bandwidth request will be successful for both SSs 2-1, 2-2, since the messages 9-2 and 9-4 do not collide and can be successively received by the MS 1. It is noted that in a system using directional antennas, the number of SSs 2 which are covered by a specific antenna direction of the MS 1 can be significantly reduced compared to a system employing omnidirectional antennas. Having described, the benefit of sending more than one bandwidth request message 9 per SS 2 and per contention window (contention period 12), the embodiment of the present invention will now be described in further detail.

The communication unit 4-2 of each one of the SSs 2 is able to decide if it has successively received the beacon 10 or not. Such decision may, for example, be made based on a known preamble comprised in the beacon 10 and/or based on a beacon 10 that is encoded using an error detection code. For example, when the number of correctly received symbols of the preamble surpasses a threshold and when the error detection code does not indicate a transmission error, the beacon is considered to be successively received. When this condition is not met, the beacon 10 is not considered to be successfully received.

Figure 6:
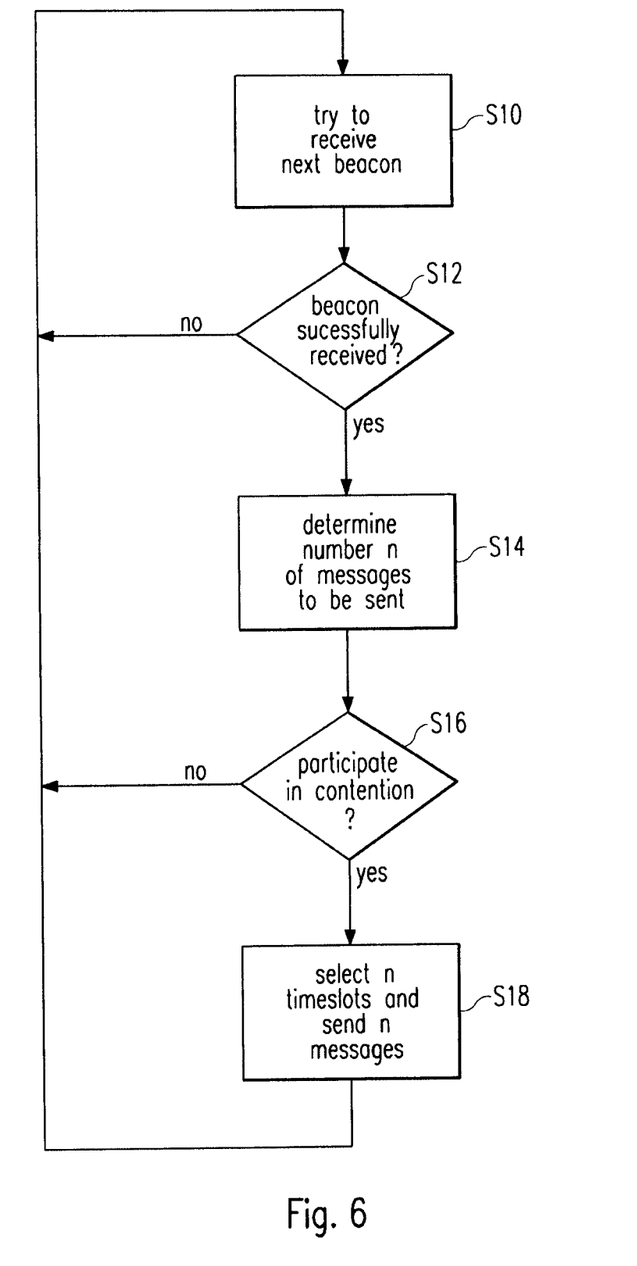
FIG. 6 shows a flow chart representing a process executed by the subscriber station node.

FIG. 6 shows a flow chart of a process performed by each one of the SSs 2.

In a step S10, the SS 2 tries to receive the next beacon 10 and proceeds to step S12. The beacon 10 comprises control information which indicates how many time slots 18/bandwidth request messages 9 the SS 2 shall use to transmit a bandwidth request during a contention window. In order to provide fairness, the number of time slots 18 to use is the same for all SSs 2 receiving the beacon 10. Additionally, the SSs 2 may be grouped into specific priority classes, whereby fairness (i.e. the same number of timeslots 9) is given only within a group of SSs 2.

In a step S12, the control unit 6-2 determines if the beacon 10 has been successfully received in step S10. If no, the process returns to step S10. If yes, the process proceeds to step S14.

In a step S14, the control unit 6-2 determines the number n of time slots 18/bandwidth request messages 9 from the received control information. Thereafter, the process proceeds to step S16.

In a step S16, the control unit 6-2 determines if it is necessary to participate in a contention. If no, the process returns to step S10. If yes, the process proceeds to step S18.

In a step S18, the control unit 6-2 randomly (uniform probability distribution) selects a number of n time slots 18 from the contention period 12 and transmits n bandwidth request messages 9, one message 9 per selected time slot. The bandwidth request messages 9 may correspond to any type of bandwidth request. For example, the bandwidth request messages 9 may request downlink and/or uplink data transmission capacity (e.g. during the uplink data period 14 and the downlink data period 16), may request bandwidth for a single flow of data or for a plurality of flows of data, may be an incremental or an aggregate request and may specify an associated quality of service. Thereafter, the process returns to step S10.

The control unit 6-1 of the MS 1 is operable to determine a number of timeslots 18/bandwidth request messages 9 each one of the SSs 2 shall use to transmit a bandwidth request during a contention window. This number may be, but is not required to be, an optimal number in some sense. The number may, for example, minimize the access delay, but other characteristics than access delay may be relevant too. The number may for example be given by a formula which provides a reasonable well system performance and is reasonably easily calculable. Nether the less, it is envisioned that the number of timeslots (transmission possibilities) 18 determined by the MS 1 is dependent on the estimated number of SSs 2 participating in the contention. For example, the number of timeslots 18 to use may be monotonically decreasing with the estimated number of SSs 2 participating in the contention. The number of SSs 2 participating in the contention may be estimated based on the number of SSs 2 allowed to participate in the contention. The number of SSs 2 participating in the contention may further be estimated based on a communication status and/or a communication history of the SSs 2 which is, for example, stored in a memory device (not shown) of the communication unit 4-1. The communication status and communication history especially may comprise a bandwidth allocation status and a bandwidth allocation history, respectively. The communication status and the communication history may comprise a contention status and a contention history (i.e. a history indicating in which way a node has made use of its right to participate in a contention in the past), respectively. Besides providing information specific to each one of the SSs 2, the communication status and communication history may comprise statistical information relating to an average SS2. The number of SSs 2 participating in the contention may further be estimated based on the type, the communication capacities and/or the information processing capacities of the SSs 2. Generally, for some kind of contention, the number of SSs which will be participating in the contention is the same as the number of SSs which are allowed to participate in the contention. Additionally or alternatively, the number of timeslots 18/bandwidth request messages 9 each one of the SSs 2 shall use to transmit a bandwidth request during a contention window may be dependent on the number of time slots 18 within the contention period 12 or on the number of available time slots 18 within the contention period 12. For every frame, the MS 1 will calculate a new estimate of the number of SSs 2 which are participating in the contention and will calculate a new number of timeslots 18 to use.

Figure 7:
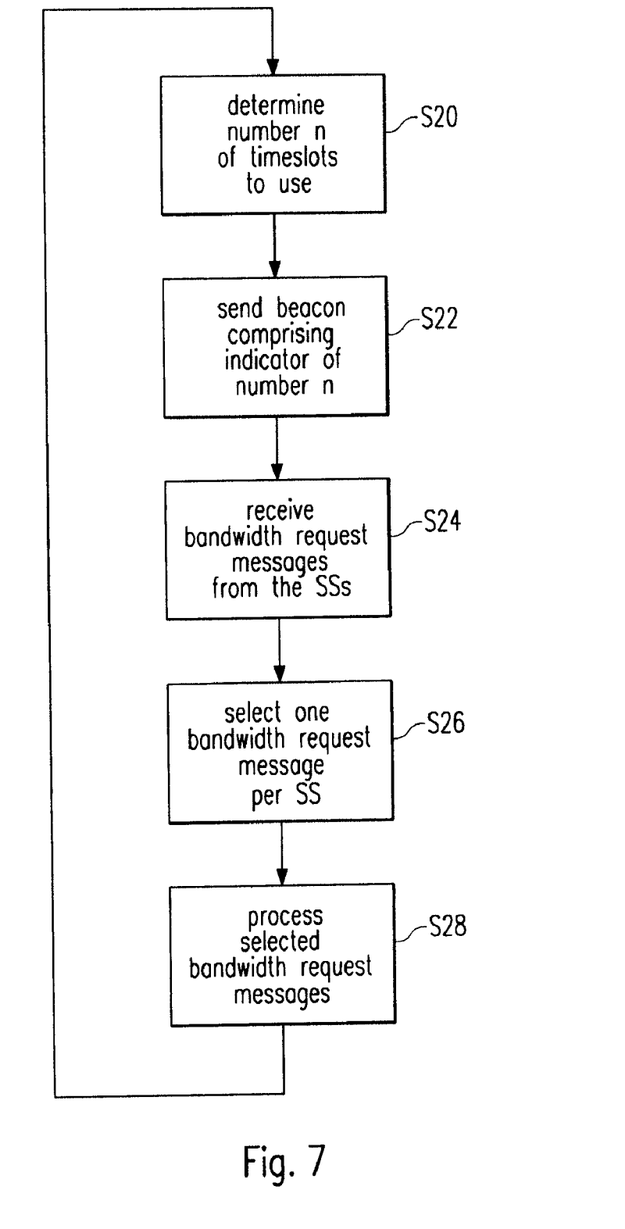
FIG. 7 shows a flow chart representing a process executed by the master station node.

FIG. 7 shows a flow chart of a process performed by the MS 1.

In a step S20, the control unit 6-1 determines the number of timeslots 18/contention participation messages 9 each one of the SSs 2 shall use to transmit a bandwidth request during the next contention window (contention period 12). In order to provide fairness, the number of timeslots 18 to use is the same for all SSs 2. Additionally, the SSs 2 may be grouped into specific priority classes, whereby fairness (i.e. the same number of timeslots 18) is given only within a group of SSs 2. Thereafter, the process proceeds to step S22.

In a step S22, the communication unit 4-1, using the direction of emission and reception for the scanning period of the current the frame, sends the beacon 10 comprising control information indicating the number of timeslots 18/contention participation messages 9 to use determined in step S20. Thereafter, the process proceeds to step S24.

In a step S24, the MS 1, using the direction of emission and reception for the scanning period of the current frame, tries to receive bandwidth request messages 9 from the SSs 2. Thereafter, the process proceeds to step S26.

For every successfully received bandwidth request (i.e. when having successfully received at least one bandwidth request message 9 corresponding to the bandwidth request), the MS 1 decides if, and, if yes, to which extent, it will grant the requested bandwidth. To achieve this, steps S26 and S28 are executed.

In a step S26, the control unit 6-1 selects, for every one of the SSs 2, the first of the bandwidth request messages 9 received from the SS 2 during the contention period for further processing. Thereafter, the process proceeds to step S28.

In a step S28, the selected messages are processed by the MS 1 with conventional devices (which may or may not be part of the communication unit 4-1, and may, for example, be part of the control unit 6-1) in the conventional way known to the skilled person which will not be further described here. Thereafter, the process returns to step S20 and is repeated for the next frame.

It is clear, that a bandwidth request message 9 is only an example of a contention participation message and that any specification given in relation to a bandwidth request message 9 should be seen as given in relation to a general contention participation message, if such is possible.

It is clear, that a time slot 18 is only an example of a communication channel and that any specification given in relation to a time slot 18 should be seen as given in relation to a general communication channel, if such is possible.

In the embodiment just described the information transmission between the nodes 1, 2 may additionally be based on OFDM.

In the foregoing, it was assumed that the contention window, which provides the set of communication channels 18 from which a SS 2 selects a number of communication channels 18 for sending a corresponding number of contention participation messages 9 (bandwidth request messages 9), is provided within a single contention period 12. Moreover, it was assumed that the contention window, which provides the set of communication channels 18 from which a SS 2 selects a number of communication channels 18 for sending a corresponding number of contention participation messages 9 (bandwidth request messages 9), is given by the communication channels 18 provided within a contention period 12. Alternate embodiments may be provided where these assumptions are not fulfilled, the alternate embodiments being the same as the embodiment described above except for some obvious adaptations and for the obvious differences described in the following.

In an alternate embodiment, the set of communication channels 18 from which a SS 2 selects a number of communication channels 18 for sending a corresponding number of contention participation messages 9 (bandwidth request messages 9) is provided within a plurality of contention periods 12. In this case, for some kinds of bandwidth request messages (e.g. incremental bandwidth requests), the MS 1 might require additional communication rules or additional information for selecting one bandwidth request message. For example, the MS 1 might assume that the first bandwidth request message 9 received from a SS 2 after having granted a bandwidth request by sending corresponding information to the SS 2 corresponds to a new bandwidth request and, thus, selects the received message 9. Or, in another example, the SSs 2 might include an identifier of the bandwidth request in each bandwidth request message 9 of that request. In this case, the MS 1 selects the first bandwidth request message 9 received from a SS 2 having an identifier different from the identifiers (recently) received from the SS 2. The space from which the identifier is chosen need not be large.

In a further alternate embodiment, the set of communication channels 18 from which a SS 2 selects a number of communication channels 18 for sending a corresponding number of contention participation messages 9 (bandwidth request messages 9) is given by or comprises a part only of the communication channels 18 provided within a contention period 12.

A combination of the alternate and the further alternate embodiment is possible. For example, in the case of an adaptive system which is varying the length of the contention window according to a truncated binary exponential backoff type of contention resolution. Such may be obtained in the following way: For a first try of a SS 2 to transmit a bandwidth request, the set of communication channels 18 is given by one half of the communication channels 18 of a contention period 12. For a second try, the set of communication channels 18 is composed of all the communication channels 18 from a contention period 12 and, for a third try, the set of communication channels is composed of the communication channels 18 of two contention periods 12.

While the present invention has been explained with reference to specific embodiments, this is by way of example only and shall not be seen as restricting the claimed scope of protection which is defined solely by the appended claims.

The invention claimed is:

1. A master node device for a communication network including slave nodes, said slave nodes including a group of first slave nodes, said master node device comprising:
   a communication unit configured to
   determine a number of contention participation messages which are to be sent by each first slave node,
   indicate the number of contention participation messages in a signal,
   receive two or more contention participation messages sent from one first slave node during a contention window associated with said one first slave node,
   select one of the received two or more contention participation messages for further processing and neglect the others, and
   repeatedly send a beacon signal and receive contention participation messages during a beacon period and a following contention period, respectively.

2. The master node device according to claim 1 wherein the communication unit comprises a radiation or wave emitter and receiver, whereby said group of first slave nodes comprises only slave nodes with which the master node device is able to communicate based on a common direction of emission and reception of the radiation or the wave emitter and receiver.

3. The master node device according to claim 1 or 2 wherein the determined number of contention participation messages is dependent on a number of said group of first slave nodes which are allowed to send a contention participation message.

4. The master node device according to claim 1 or 2 wherein the determined number of contention participation messages is dependent on a number of said group of first slave nodes which are expected to send a contention participation message.

5. The master node device according to claim 1 or 2, wherein the communication unit is adapted to repeatedly determine the number of contention participation messages and send it to the first slave nodes.

6. The master node device according to claim 1 wherein the nodes of said group of first slave nodes are allowed to compete for a right or status in the communication network granted by the master node by means of sending contention participation messages to the master node.

7. The master node device according to claim 1 wherein said beacon period and said following contention period together form a path scanning period, such that the beacon signal and the contention participation messages of the path scanning period are sent and received using a same direction of emission and reception and the beacon signal and contention participation messages of at least two different path scanning periods are sent and received using different directions of emission and reception.

8. A slave node device for a communication network comprising slave nodes, said slave nodes comprising a group of first slave nodes, said slave node device being a member of said group of first slave nodes,
   said slave node device comprising
   a communication unit adapted to
   determine a number of contention participation messages which are to be sent during a contention window, and
   repeatedly receive a beacon signal and send contention participation messages during a beacon period and a following contention period, respectively, and
   a control unit adapted to
   send two or more contention participation messages during the contention window associated with the slave node device, the number of contention participation messages is indicated in a signal received by the slave node device and
   the control unit is adapted to determine the number of contention participation messages based on the received signal.

9. The slave node device according to claim 8 wherein the control unit is adapted to repeatedly determine the number of contention participation messages.

10. The slave node device according to claim 8 wherein by means of the two or more contention participation messages, the slave node device competes with the other nodes of said group of first slave nodes for a right or status in the communication network granted by the master node.

11. The slave node device according to claim 8 wherein said beacon period and said following contention period together form a path scanning period, such that
   the beacon signal and the contention participation messages of a given path scanning period are received and sent using a same direction of emission and reception, and
   the beacon signal and the contention participation messages of at least two different path scanning periods are received and sent using different directions of emission and reception.

12. The slave node device according to claim 8 or 11 wherein the control unit is adapted to
   determine if the communication unit has successively received a beacon signal in a given beacon period and determine a set of communication channels, each communication channel adopted to transmit exactly one contention participation message, said set of communication channels corresponding to said contention window, such that
   said set of communication channels is determined to comprise communication channels from among communication channels provided by the contention period following a given beacon period in case that a beacon signal is determined to be successively received in the given beacon period, and
   said set of communication channels is determined not to comprise communication channels from among communication channels provided by the contention period following a given beacon period in case that a beacon signal is not determined to be successively received in the given beacon period.

13. A communication network comprising the master node device according to any one of claim 1, 2, and 7 and at least one slave node device according to any one of claim 8, and 11.

14. A method of contention in a network comprising slave nodes, said slave nodes comprising a group of first slave nodes, the method comprising:
- automatically determining a number of contention participation messages which are to be sent by each of the group of first slave nodes,
- repeatedly sending a beacon signal from a master node to said group of first slave nodes and the number of contention participation messages from said group of first slave nodes to a master node during a beacon period and a following contention period, respectively;
- in case the determined number is equal or more than two, sending, by every of the group of first slave nodes participating in a contention, the determined number of contention participation messages during a contention window associated with respective of the group of first slave nodes participating in the contention; and
- in case that the determined number of contention participation messages is one, sending, by every of the first slave nodes participating in the contention, one contention participation message during the contention window associated with a corresponding first slave node.

15. The method according to claim 14 wherein the network comprises the master node, said master node comprising a radiation or wave emitter and receiver, whereby
- said group of first slave nodes comprises only slave nodes with which the master node is able to communicate based on a common direction of emission and reception of the radiation or wave emitter and receiver.

16. The method according to claim 14 or 15 wherein the automatically determining the number of two or more contention participation messages is based on a number of first slave nodes which are allowed to participate in the contention.

17. The method according to claim 14 or 15 wherein the automatically determining the number of two or more contention participation messages is based on a number of first slave nodes which are expected to participate in the contention.

18. The method according to claim 14 or 15 wherein the automatically determining the number of two or more contention participation messages is executed repeatedly.

19. The method according to claim 18 wherein said first slave nodes participating in the contention compete for a right or status in the communication network granted by the master node by means of sending contention participation messages to the master node.

20. The method according to claim 14 wherein said beacon period and said following contention period together form a path scanning period, such that
- the number of two or more contention participation messages of a given path scanning period and sent by a given first slave node and the beacon signal of said given path scanning period are transmitted using a same communication path and
- the number of two or more contention participation messages of at least two different path scanning periods and sent by a given slave node and the beacon signals of said at least two different path scanning periods are transmitted using different communication paths.

21. The method according to claim 14 or 20 comprising:
- determining, for every of the first slave nodes, if the first slave node has successively received a beacon signal in the beacon period and
- determining, for every of the first slave nodes, a set of communication channels, each communication channel adapted to transmit exactly one contention participation message, said set of communication channels corresponding to said contention window associated with the first slave node, such that,
- in case that the beacon signal is determined to be successively received in the beacon period by one of the first slave nodes, the set of communication channels is determined to comprise communication channels from among communication channels provided by the contention period following the beacon period, and,
- in case that the beacon signal is not determined to be successively received in the beacon period, said set of communication channels is determined not to comprise communication channels from among communication channels provided by the contention period following the beacon period.

* * * * *